R. PINTSCH.

Floating Signal Light.

No. 9,664. Reissued April 12, 1881.

Witnesses:
John C. Trumbridge
Willy H. G. Schultz.

Inventor
Richard Pintsch
by his attorney Alex Briesen

3 Sheets—Sheet 2.

R. PINTSCH.

Floating Signal Light.

No. 9,664. Reissued April 12, 1881.

Witnesses:
John C. Tunbridge.
Willy G. E. Schultz.

Inventor:
Richard Pintsch
by his attorney
A. v. Briesen

3 Sheets—Sheet 3.
R. PINTSCH.
Floating Signal Light.
No. 9,664. Reissued April 12, 1881.
Fig: 3
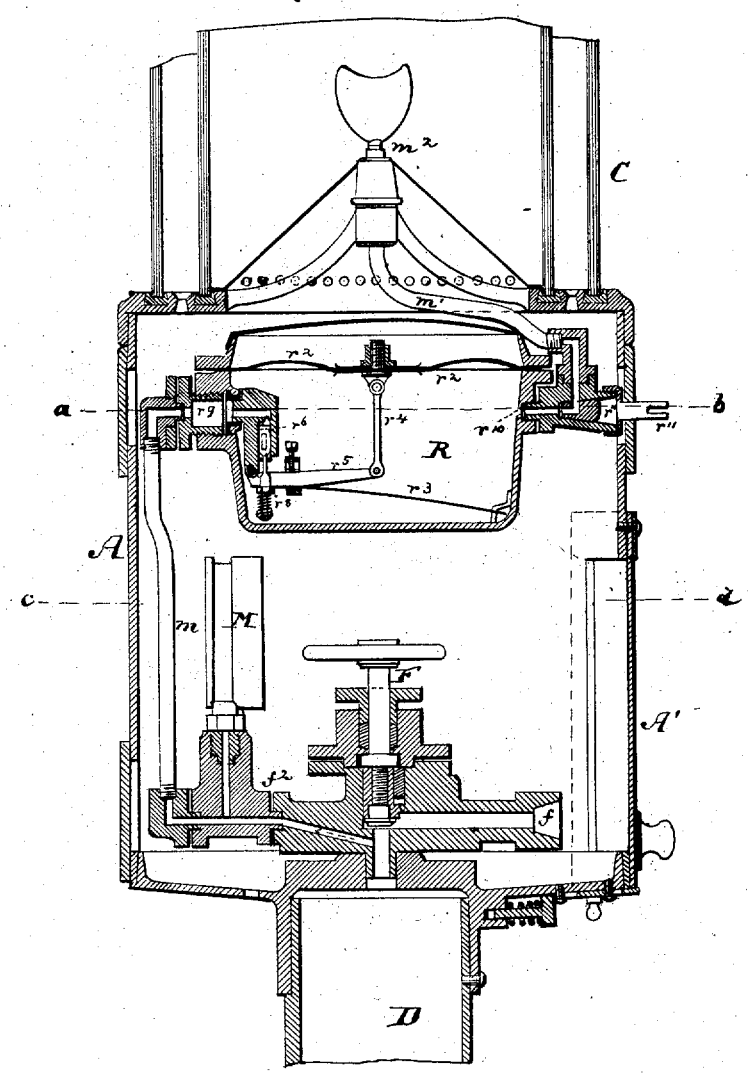
Fig: 7
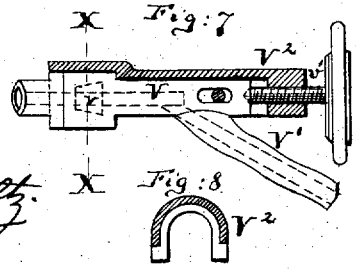
Fig: 8
Witnesses:
John E. Tunbridge
Willy H. E. Schmitz.
Inventor:
Richard Pintsch
by his attorney
A. v. Briesen

UNITED STATES PATENT OFFICE.

RICHARD PINTSCH, OF BERLIN, GERMANY.

FLOATING SIGNAL-LIGHT.

SPECIFICATION forming part of Reissued Letters Patent No. 9,664, dated April 12, 1881.

Original No. 190,979, dated May 22, 1877. Application for reissue filed August 25, 1880.

DIVISION A.

*To all whom it may concern:*

Be it known that I, RICHARD PINTSCH, of Berlin, Prussia, Germany, have invented an Improvement in Signal-Lights, of which the following is a complete description.

This invention relates more particularly to improved means and apparatus whereby buoys moored off the sea-coast, or in other waterways, are rendered available as floating lights, for indicating their position at night or in dark weather, such apparatus being also available for use in light-ships, or for lights generally.

The invention consists, mainly, in employing recipients for illuminating-gas under pressure, which is supplied thereto at intervals from a reservoir by means of flexible hose temporarily attached to an inlet-pipe, with stop-cock on the recipient. A vertical tube leads from the latter to a lantern in which are one or more gas-burners, supplied with gas from the interior of the recipient, a regulator being provided at any convenient point of the supply-pipe, for reducing the pressure of the gas as it passes from the recipient to the ordinary pressure of illuminating-gas before it issues from the burner or burners.

Figure 1:
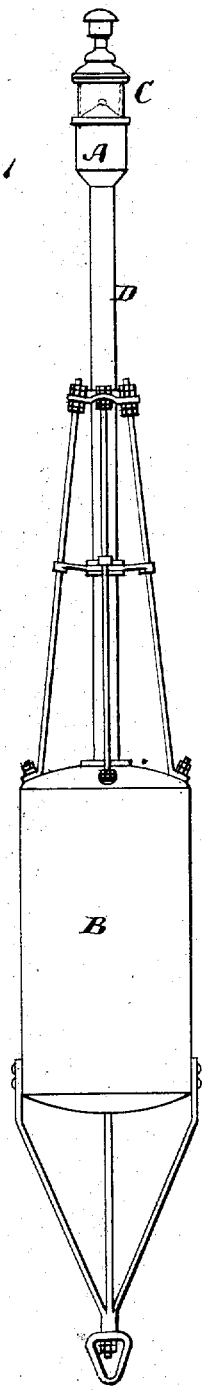
Figure 4:
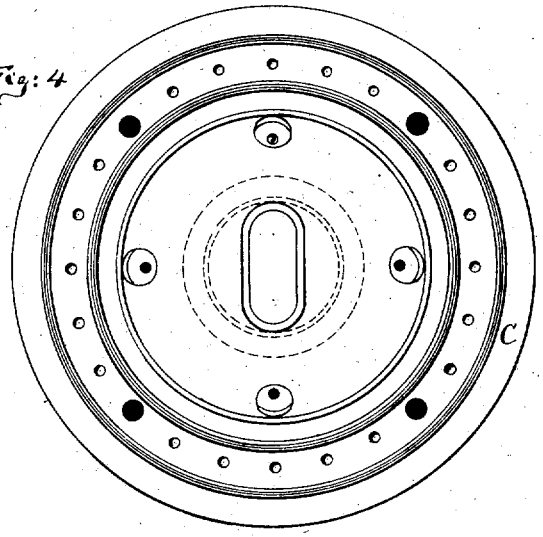
Figure 5:
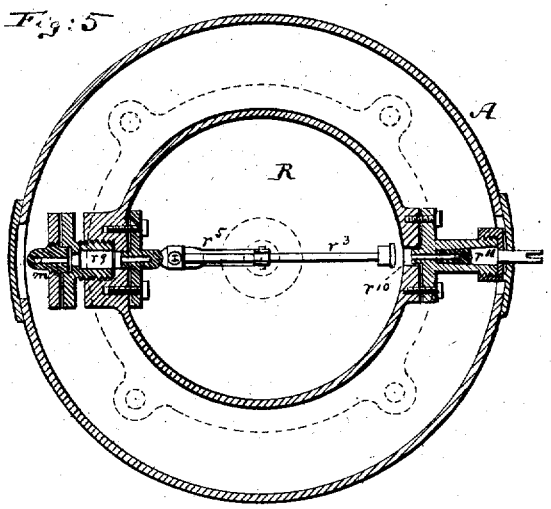
Figure 6:
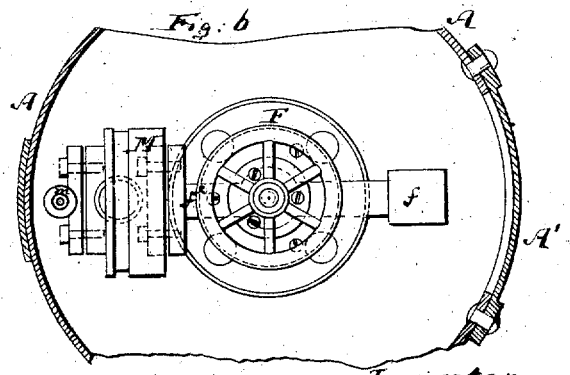
Figure 2:
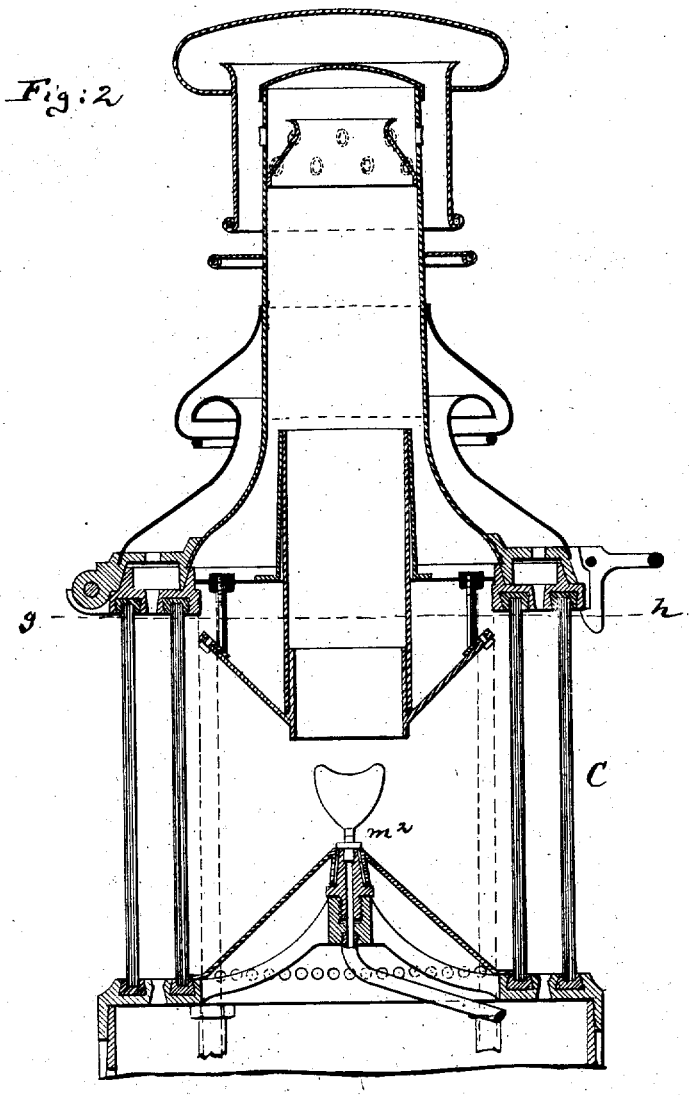

In the drawings, Figure 1 shows an elevation of the buoy and lantern. Figs. 2 and 3 show an enlarged vertical section, respectively, of the lantern and of the casing below. Figs. 4, 5, and 6 show cross-sections taken, respectively, on lines *g h*, *a b*, and *c d*, Figs. 2 and 3. Fig. 7 shows a longitudinal section, and Fig. 8 a cross-section at X X of a device for connecting the charging-hose to the inlet-pipe of the gas-recipient for filling the latter with gas.

The recipient or buoy B, Fig. 1, is constructed of strong sheet metal, of cylindrical or other suitable form, capable of withstanding considerable internal pressure. It is secured at its lower end to any suitable moorings in the usual manner, and has fixed on its upper end a tube, D, strengthened by stays, and carrying at its upper end a casing, A, surmounted by a lantern, C. The tube D serves both to convey the supply of gas under pressure from the charging-reservoir into the buoy or recipient, and to conduct the gas from the buoy to the burner $m^2$ in the lantern. For the first-named purpose the tube has, at its upper end within the casing A, a side branch, *f*, the communication between which and the tube is closed by a screw-valve, F. The branch *f* has a coned recess at its end, as shown, for receiving the coned end *v* of the nozzle V, Fig. 7, the branch V′ of which is attached to a flexible pipe leading to the charging-reservoir.

For charging the buoy or recipient the reservoir containing compressed gas is brought close alongside, and a sliding door, A′, in the casing being opened, the end *v* of the nozzle V is placed inside the socket of the branch *f*, and is forced gas-tight therein by means of a screw, *v*′, carried by a sleeve, $V^2$, connected to the nozzle, and having a claw embracing a collar on the branch *f*, as shown. The nozzle having been securely fixed, the screw-valve F is opened, and the compressed gas is allowed to flow from the reservoir into the buoy until the pressure-gage M, fixed on another branch pipe, $f^2$, indicates that the gas in the buoy has attained the required degree of compression. The valve F is then again closed and the supply-hose detached. The compressed gas now passes from the buoy through the passage $f^2$ and pipe *m* into the regulator R, which is, by preference, of the same construction as that described in my previous patent of 4th May, 1875, No. 162,946, in which the gas flowing from the pipe *m* passes through the dust-collector $r^9$ and valve $r^6$ into the chamber R, in which is a lever, $r^5$, connected to the valve $r^6$, and also to an impermeable flexible diaphragm, $r^2$, by a rod, $r^4$, so that the pressure of the gas entering the chamber tends to raise the diaphragm, so as to close the inlet-valve more or less.

A spring, $r^3$, is connected to and acts upon the lever $r^5$ in such a manner as to hold the valve open in the exact position for admitting sufficient gas to maintain the required pressure in the regulator. A second spring, $r^8$, is also connected to the lever $r^5$ and to the stem of the valve, so that when the lantern is made to assume an inclined or nearly horizontal position by the action of the waves on a buoy this spring will replace the action of gravity in pulling the valve open after it has been closed through excess of pressure.

From the regulator the gas passes through the passage $r^{10}$ and cock $r^{11}$ to the pipe $m'$, whence it passes to the burner $m^2$. The cock $r^{11}$ can be turned from outside the casing to adjust the flame of the burner.

The lantern itself does not constitute part of the invention here to be described, as it is made the subject of a separate division of reissue of the Letters Patent of which this is one division.

It will be readily understood that the above arrangement of a reservoir of compressed illuminating-gas, in combination with the regulator and lantern, may also be used with advantage on other lights than buoys without further invention.

I claim—

1. In an apparatus for consuming compressed illuminating-gas, the combination of the recipient B, having inlet-pipe $f$ and valve F and the outlet-pipe $m$, and otherwise closed on all sides, with a lamp and an interposed regulating apparatus, for reducing the pressure of the gas as it passes from the recipient to the burner, substantially as herein shown and described.

2. An illuminating apparatus consisting of the recipient B, which is adapted to hold compressed illuminating-gas, and has but one opening through which it is filled and emptied, in combination with pipe D, inlet-pipe $f$, valve F, and outlet-pipe $m$, substantially as described.

RICHARD PINTSCH.

Witnesses:

BERTHOLD ROI,

BANCROFT C. DAVIS.